(12) United States Patent
Dobberfuhl et al.

(10) Patent No.: US 9,849,967 B2
(45) Date of Patent: Dec. 26, 2017

(54) COMPOSITE RIB FOR AN AIRCRAFT

(71) Applicant: The Boeing Company, Chicago, IL (US)

(72) Inventors: James P. Dobberfuhl, Clinton, WA (US); Matt D. Uhlman, Kirkland, WA (US); William J. Moon, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 146 days.

(21) Appl. No.: 14/676,271

(22) Filed: Apr. 1, 2015

(65) Prior Publication Data

US 2016/0288899 A1    Oct. 6, 2016

(51) Int. Cl.
*B64C 1/00* (2006.01)
*B64C 3/18* (2006.01)
*B64C 3/26* (2006.01)

(52) U.S. Cl.
CPC ............. *B64C 3/187* (2013.01); *B64C 3/18* (2013.01); *B64C 3/182* (2013.01); *B64C 3/185* (2013.01); *B64C 3/26* (2013.01)

(58) Field of Classification Search
CPC ......... B64C 3/182; B64C 3/187; B64C 3/185; B64C 3/26; B64C 3/18; B29C 65/4805
See application file for complete search history.

(56) References Cited

U.S. PATENT DOCUMENTS

| | | | |
|---|---|---|---|
| 2,414,346 A | 1/1947 | Wheelon | |
| 5,242,523 A * | 9/1993 | Willden | B29C 70/44 156/245 |
| 6,511,570 B2 * | 1/2003 | Matsui | B29C 70/345 156/245 |
| 6,730,184 B2 * | 5/2004 | Kondo | B29C 70/345 156/182 |
| 6,786,452 B2 | 9/2004 | Yamashita et al. | |
| 7,159,822 B2 * | 1/2007 | Grantham | B64C 1/12 244/119 |
| 7,635,106 B2 * | 12/2009 | Pham | B64C 3/182 244/123.1 |

(Continued)

FOREIGN PATENT DOCUMENTS

| EP | 1942052 A1 | 7/2008 |
|---|---|---|
| EP | 2851283 A1 | 3/2015 |

(Continued)

OTHER PUBLICATIONS

European Search Report Application No. 16161349.2 dated Aug. 11, 2016.

*Primary Examiner* — Assres H Woldemaryam
(74) *Attorney, Agent, or Firm* — Miller, Matthias & Hull LLP

(57) ABSTRACT

A rib is disclosed for use in a torque box of a wing structure provided on an aircraft. The wing structure has a skin panel and a stringer coupled to the skin panel. The rib includes a web defining at least one stringer hole sized to receive the stringer, a shear tie coupled to the web and configured to engage the skin panel, and a clip positioned adjacent the at least one stringer hole. The clip has a base coupled to and aligned with the web, a head extending at an angle relative to the base and configured to engage the stringer, and a transition portion extending between the base and the head.

20 Claims, 4 Drawing Sheets

(56) References Cited

U.S. PATENT DOCUMENTS

| | | |
|---|---|---|
| 7,716,835 B2 | 5/2010 | Johnson et al. |
| 7,963,477 B2 | 6/2011 | Soula et al. |
| 8,262,024 B2 | 9/2012 | Marquez Lopez et al. |
| 8,523,111 B2 | 9/2013 | Williams |
| 8,714,485 B2 * | 5/2014 | Matheson ............... B64C 3/182 244/123.1 |
| 9,382,014 B2 * | 7/2016 | Brook .................... B64D 37/32 |
| 2003/0080251 A1 * | 5/2003 | Anast ..................... B64C 1/068 244/119 |
| 2003/0178458 A1 * | 9/2003 | Trambley ................. B60R 9/04 224/326 |
| 2005/0263645 A1 * | 12/2005 | Johnson ............... B61D 17/041 244/119 |
| 2010/0148008 A1 * | 6/2010 | Hernando Sebastian ................ B64C 3/187 244/131 |
| 2011/0248119 A1 * | 10/2011 | Stol .......................... B63B 3/00 244/131 |
| 2013/0216766 A1 * | 8/2013 | Tanaka .................... B64C 3/182 428/99 |
| 2013/0236692 A1 * | 9/2013 | Tanaka .................... B64C 3/182 428/137 |
| 2013/0243992 A1 * | 9/2013 | Tanaka .................... B64C 3/182 428/58 |
| 2013/0320142 A1 * | 12/2013 | Nordman ................. B64C 3/20 244/123.5 |

FOREIGN PATENT DOCUMENTS

| | | | | |
|---|---|---|---|---|
| GB | 654206 A | * | 6/1951 | ............... B64C 3/00 |
| WO | 2014065719 A1 | | 5/2014 | |

* cited by examiner

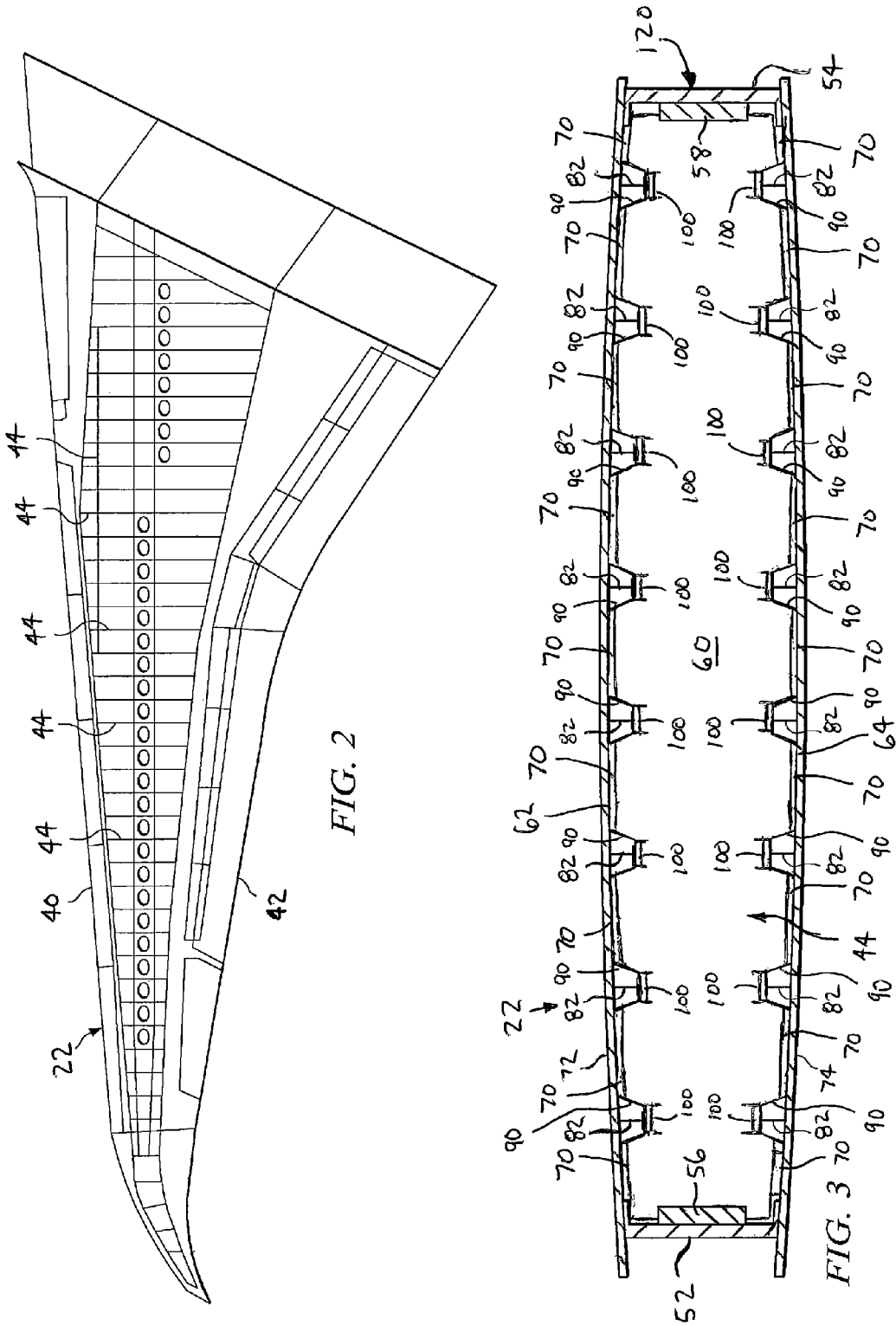

COMPOSITE RIB FOR AN AIRCRAFT

FIELD

The present disclosure generally relates to structural components for aircraft and, more specifically, to composite ribs used on aircraft.

BACKGROUND

Aircraft wing structures, such as the main wings or the horizontal and vertical stabilizers of an empennage, are subject to torque forces during flight. Accordingly, the wing structures typically include torque boxes to reinforce the wing structures against these torque forces. Torque boxes often include a plurality of ribs oriented to extend along a chord direction of the wing structure. In some applications, the ribs are attached directly to the skin of the wing structure, in which case stringer holes are formed in the rib to accommodate stringers extending in a span direction of the wing structure. The stringer holes may reduce the ability of the rib to distribute loads near the stringers, and therefore it is known to attach the rib to the stringers using stringer clips.

The use of stringer clips to connect the rib to the stringers may introduce several inefficiencies. For example, the clips are connected to both the rib and a selected stringer, thereby complicating manufacturing of the wing structure. Additionally, the stringer clips are typically attached to the web with fasteners, which not only adds weight but also includes holes formed in the rib. Thus, it would be desirable to connect the rib to stringers in a manner that avoids these disadvantages.

SUMMARY

In accordance with one aspect of the present disclosure, a rib is provided for a wing structure of an aircraft, in which the wing structure includes a skin panel and a stringer coupled to the skin panel. The rib includes a web defining at least one stringer hole sized to receive the stringer, a shear tie coupled to the web and configured to engage the skin panel, and a clip positioned adjacent the at least one stringer hole. The clip has a base coupled to and aligned with the web, a head extending at an angle relative to the base and configured to engage the stringer, and a transition portion extending between the base and the head.

In another aspect of the disclosure that may be combined with any of these aspects, a torque box is provided for a wing structure of an aircraft. The torque box includes a front spar and a rear spar, an upper skin panel extending from the front spar to the rear spar, a lower skin panel extending from the front spar to the rear spar, and a stringer coupled to at least one of the upper and lower skin panels and oriented along a span direction of the wing structure. The torque box further includes a rib oriented along a chord direction of the wing structure, the rib including a web defining at least one stringer hole sized to receive the stringer, a shear tie coupled to the web and configured to engage the at least one of the upper and lower skin panels, and a clip positioned adjacent the at least one stringer hole, the clip having a base coupled to and aligned with the web, a head extending at an angle relative to the base and configured to engage the stringer, and a transition portion extending between the base and the head.

In another aspect of the disclosure that may be combined with any of these aspects, a torque box is provided for a wing structure of an aircraft, the torque box including a front spar and a rear spar, an upper skin panel extending from the front spar to the rear spar, a lower skin panel extending from the front spar to the rear spar, and a stringer coupled to at least one of the upper and lower skin panels and oriented along a span direction of the wing structure. The torque box further includes a rib oriented along a chord direction of the wing structure and having a web defining a web axis and at least one stringer hole sized to receive the stringer, a shear tie formed integrally with the web and configured to engage the at least one of the upper and lower skin panels, and a clip formed integrally with the web and positioned adjacent the at least one stringer hole, the clip having a base defining a base axis, a head extending at an angle relative to the base and configured to engage the stringer, and a transition portion extending between the base and the head, wherein the base axis is coincident with the web axis.

In another aspect of the disclosure that may be combined with any of these aspects, the clip is formed integrally with the web.

In another aspect of the disclosure that may be combined with any of these aspects, the clip and shear tie are formed integrally with the web.

In another aspect of the disclosure that may be combined with any of these aspects, the web, shear tie, and clip are formed of a composite material.

In another aspect of the disclosure that may be combined with any of these aspects, the shear tie includes a base end aligned with the web, a connection end extending at an angle relative to the base end, and a transition portion extending from the base end to the connection end.

In another aspect of the disclosure that may be combined with any of these aspects, the transition portion of the shear tie extends along a shear tie radius, and the transition portion of the clip extends along a clip radius.

In another aspect of the disclosure that may be combined with any of these aspects, the clip radius is equal to the shear tie radius.

In another aspect of the disclosure that may be combined with any of these aspects, the web defines a web axis, the base of the clip defines a base axis, and the base axis is coincident with the web axis.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

For a more complete understanding of the disclosed methods and apparatuses, reference should be made to the embodiment illustrated in greater detail on the accompanying drawings, wherein:

FIG. 2 is a top view of a wing according to an embodiment of the present disclosure;

FIG. 3 is a side elevation view, in cross-section, of a portion of the wing illustrated in FIG. 2;

Figure 1:
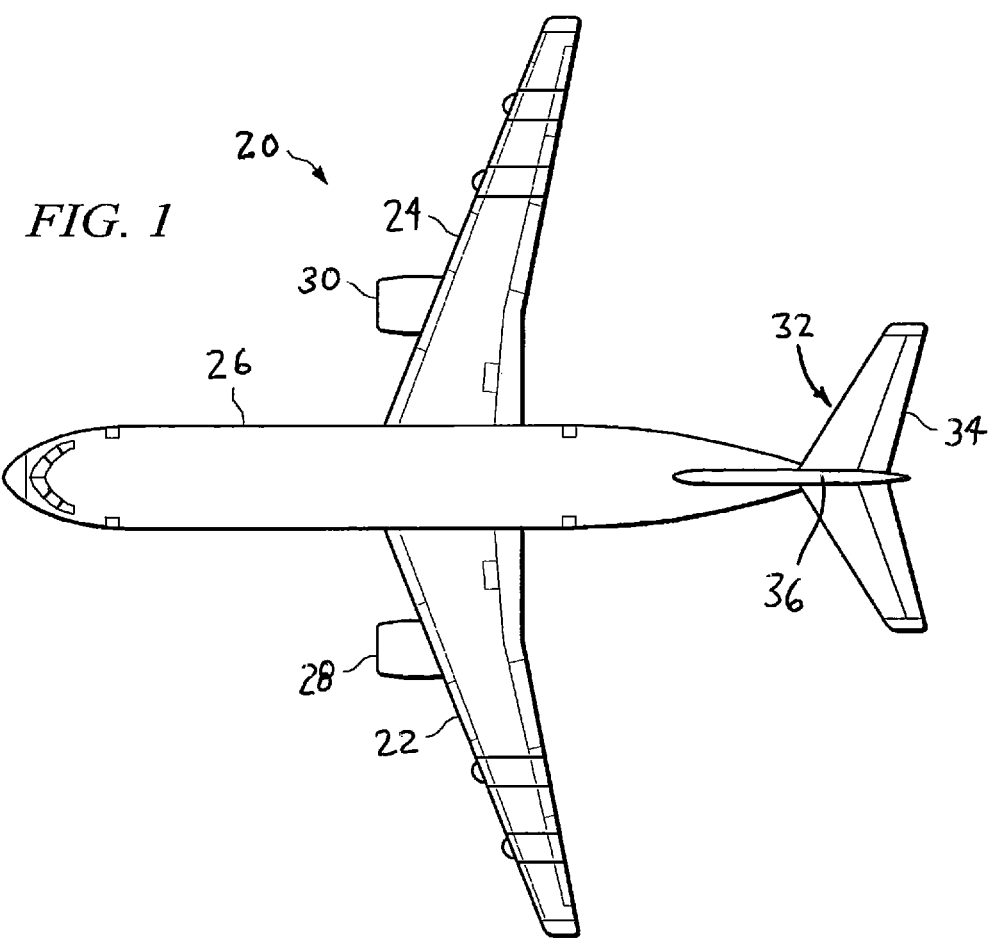
FIG. 1 is an example of an aircraft in which the advantageous embodiments of the present disclosure may be implemented.
Figure 4:
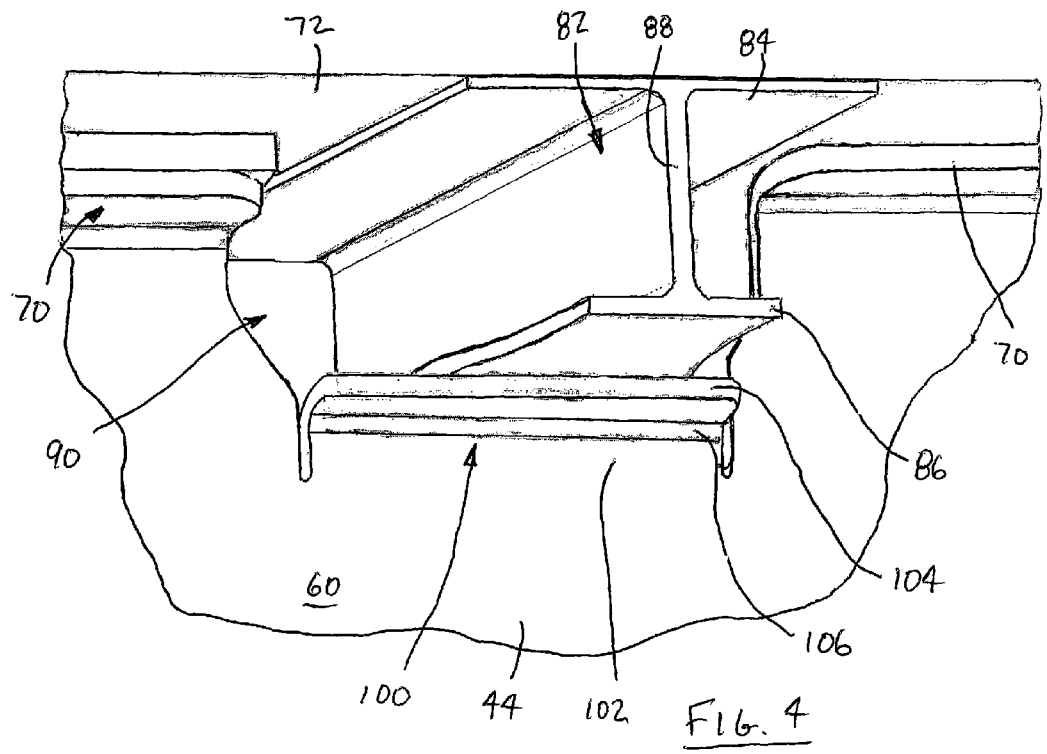
FIG. 4 is an enlarged perspective view of an interface between a stringer and a rib provided in the embodiment of FIG. 3.

It should be understood that the drawings are not necessarily drawn to scale and that the disclosed embodiments are sometimes illustrated schematically. It is to be further appreciated that the following detailed description is merely exemplary in nature and is not intended to limit the invention or the application and uses thereof. Hence, although the present disclosure is, for convenience of explanation, depicted and described as certain illustrative embodiments, it will be appreciated that it can be implemented in various other types of embodiments and in various other systems and environments.

DETAILED DESCRIPTION

The following detailed description is of the best currently contemplated modes of carrying out embodiments of the present disclosure. The description is not to be taken in a limiting sense, but is made merely for the purpose of illustrating the general principles of the disclosure, since the scope of the invention is best defined by the appended claims.

For ease of understanding the orientation in the drawings, the term "chord direction" shall refer to a direction substantially parallel to a chord of the wing structure, while the term "span direction" shall refer to a direction substantially parallel to a span of the wing structure. As used herein, a "wing structure" may be a main wing, a horizontal or vertical stabilizer of an empennage, or other structure commonly referred to as a wing or an airfoil on an aircraft.

FIG. 1 illustrates an exemplary aircraft 20 in which the advantageous embodiments of the present disclosure may be implemented. The aircraft 20 is an example of an aircraft in which a rib having an integral stringer clip may be used. In the illustrated embodiment, the aircraft 20 includes main wings 22, 24 attached to a body 26. The aircraft 20 further includes wing mounted engines 28, 30 and an empennage 32 having a horizontal stabilizer 34 and a vertical stabilizer 36. Disclosed herein are embodiments of a rib capable of direct connection to skin panels and stringers provided in the main wings 22, 24 and/or horizontal and vertical stabilizers 34, 36.

A top view of the main wing 22 is diagrammatically depicted in FIG. 2. In the illustrated embodiment, the main wing 22 has a leading edge 40 and a trailing edge 42. The main wing 22 further includes multiple ribs 44 having clips for attachment to stringers, according to the present disclosure. Other ribs of the main wing 22 shown in FIG. 2 may also include integral clips, but are unlabeled to simplify the illustration. The ribs 44 may be formed of a composite material having a high strength to weight ratio. Exemplary materials include titanium composites, graphite composites, and graphite combined with a toughened epoxy resin.

FIG. 3 illustrates a side elevation view, in cross-section, of a portion of the main wing 22 shown in FIG. 2. More specifically, FIG. 3 provides a more detailed view of one of the ribs 44 provided in the main wing 22. The rib 44 generally has a planar shape extending in a chord direction of the main wing 22 from a front spar 52 to a rear spar 54. The rib 44 is coupled to the front spar 52 by a front rib post 56 and to the rear spar 54 by a rear rib post 58. The rib 44 includes a web 60 having an upper side 62 and a lower side 64.

Figure 5:
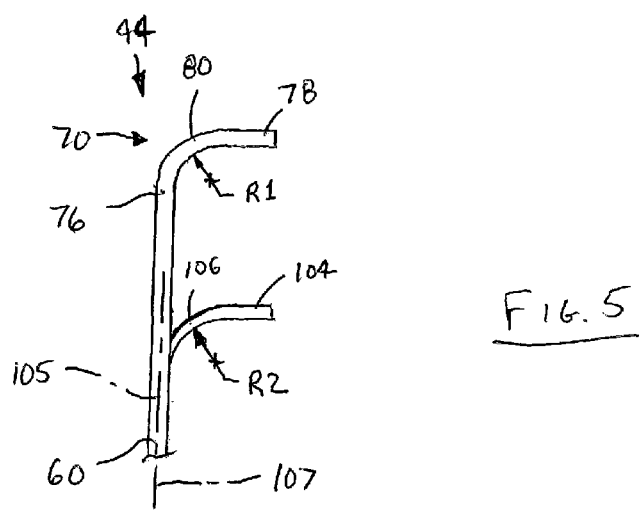
FIG. 5 is a side elevation view of a portion of the rib shown in FIGS. 3 and 4.
Figure 6:
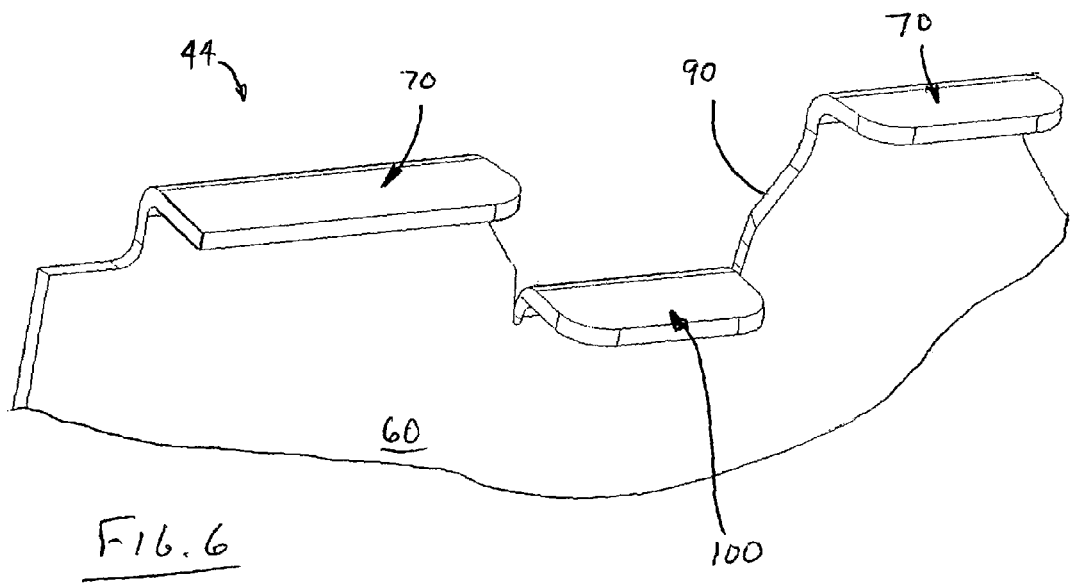
FIG. 6 is a top perspective view of a portion of the rib shown in FIGS. 3 and 4.
Figure 7:
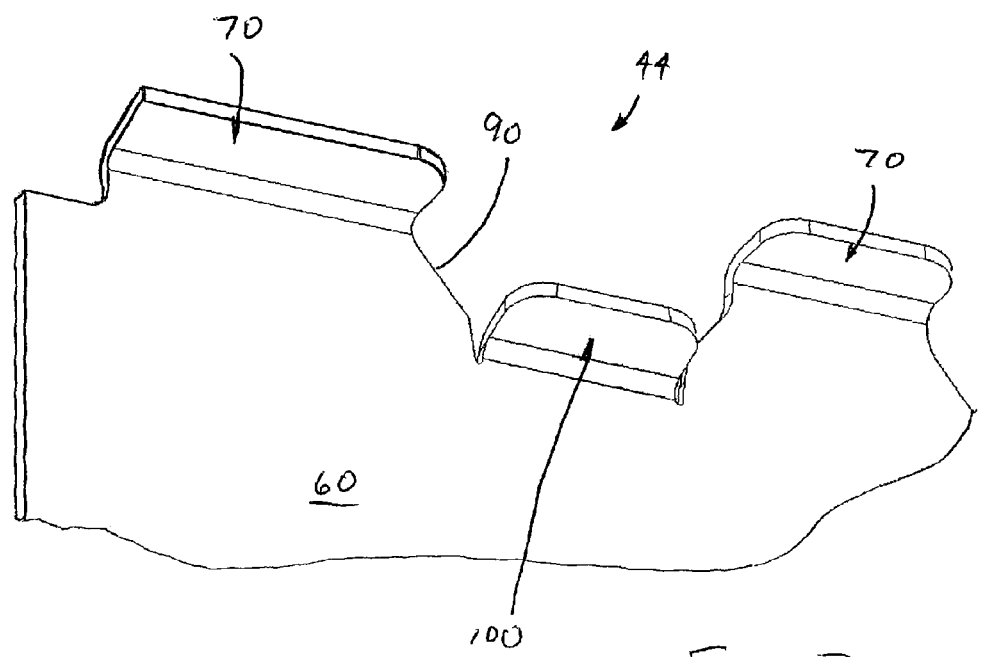
FIG. 7 is a bottom perspective view of a portion of the rib shown in FIGS. 3 and 4.

As best shown in FIG. 3, the rib 44 includes shear ties for connecting to upper and lower skin panels. More specifically, multiple shear ties 70 extend from the upper and lower sides 62, 64 of the web 60 and are configured for attachment to upper and lower skin panels 72, 74. In the exemplary embodiment illustrated in FIGS. 4-7, each shear tie 70 is formed integrally with the web 60. More specifically, the shear tie 70 includes a base end 76 aligned with the web 60, a connection end 78 extending at an angle relative to the base end 76, and a transition portion 80 extending from the base end 76 to the connection end 78. As shown in FIG. 5, the transition portion 80 has an arcuate shape defined by a shear tie radius R1. The connection end 78 of each shear tie 70 may be attached to one of the upper and lower skin panels 72, 74 by fasteners, adhesives, or welding (i.e., thermoplastic welds).

The rib 44 further includes stringer holes for accommodating stringers provided in the main wing 22. Referring to FIG. 3, the main wing 22 includes multiple stringers 82 extending in a span direction of the main wing 22. Each of the exemplary stringers 82 is shown having a base 84 coupled to one of the upper and lower skin panels 72, 74, a crown 86, and a stringer web 88 extending between the base 84 and the crown 86. In the illustrated embodiment, the stringers 82 are shown having I-shaped cross-sectional profiles, however other cross-sectional profile shapes may be used without departing from the scope of the present disclosure. The web 60 of the rib 44 is formed with stringer holes 90, with each stringer hole 90 sized to permit an associated stringer 82 to pass through the rib 44 as it traverses the span of the main wing 22.

The rib 44 further includes clips 100 for engaging the stringers 82 passing through the stringer holes 90. More specifically, multiple clips 100 extend from the upper and lower sides 62, 64 of the web 60 and are configured for attachment to the crowns 86 of the stringers 82. Each clip 100 may be attached to an associated stringer 82 by fasteners, adhesives, or welding (i.e., thermoplastic welds). In the exemplary embodiment illustrated in FIGS. 4-7, each clip 100 is formed integrally with the web 60. More specifically, the clip 100 includes a base 102 aligned with the web 60, a head 104 extending at an angle relative to the base 102, and a transition portion 106 extending from the base 102 to the head 104. As shown in FIG. 5, the base 102 defines a base axis 105 that is coincident with a web axis 107 of the web 60. FIG. 5 further illustrates that the transition portion 106 of each clip 100 has an arcuate shape defined by a clip radius R2. In the exemplary embodiment, the clip radius R2 is substantially equal to the shear tie radius R1. In other embodiments, the clip radius R2 is different from the shear tie radius R1.

The rib 44 may form part of a torque box assembly provided in the main wing 22. In the exemplary embodiment, a torque box assembly 120 is formed by the front and rear spars 52, 54, upper and lower skin panels 72, 74, stringers 82, and ribs 44. When these components are assembled, the resulting torque box assembly 120 provides a reinforced structure that better withstands the torque forces encountered by the main wing 22 during flight. More specifically, the torque forces may deflect the skin panels 72, 74, stringers 82, and/or spars 52, 54, thereby causing stresses in the ribs 44. The clips 100 move evenly distribute stresses in the ribs 44 that would otherwise be more concentrated near the stringer holes 90.

The clips 100 disclosed herein transfer loads more efficiently than the conventional stringer clips. As noted above, conventional stringer clips are attached to the rib in cantilever fashion using bolts. Because the conventional stringer clip is offset from the web, loads applied to the clip will induce an increased bending moment that must be counteracted by the fasteners. Additionally, the use of fasteners to attach the conventional stringer clip to the web uses holes in both the web and the stringer clip, thereby creating additional areas of stress concentrations. The clips 100 disclosed herein are aligned with the web 60, thereby reducing the bending moment applied to the rib 44. Additionally, when the clips 100 are formed integrally with the web 60, fastener holes are no longer needed and therefore the higher stress concentrations associated therewith are eliminated. Accordingly, the clips 100 more efficiently transfer loads between the skin panels 72, 74 and the ribs 44.

Further advantages may be recognized when the clip radius R2 is substantially equal to the shear tie radius R1. For example, using the same radius for both the clips 100 and the shear ties 70 will impart a similar amount of stiffness to the ribs 44, thereby reducing a possible source of stress concentrations in the ribs 44.

While the exemplary embodiments described above include shear ties 70 and clips 100 that are formed integrally with the web 44, it will be appreciated that one or more shear tie 70 and/or one or more clip 100 may be formed separately and subsequently attached to the web 44. As used herein, the term "coupled" is intended to encompass components that are integrally formed or that are formed separately and subsequently connected. Furthermore, the term "coupled" is not specific as to whether or not the components identified as being coupled actually engage one another, and therefore the term "coupled" is intended to encompass both "directly" and "indirectly" coupled components.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A rib for a wing structure of an aircraft, the wing structure including a skin panel and a stringer coupled to the skin panel, the rib comprising:
    a web defining at least one stringer hole sized to receive the stringer;
    a shear tie coupled to the web; the shear tie configured to engage the skin panel at an upper portion of the stringer hole; and
    a clip positioned adjacent the at least one stringer hole, the clip defining a bottom portion of the stringer hole; the clip having a base coupled to and aligned with the web, a head extending at an angle relative to the base and configured to engage the stringer, and a transition portion extending between the base and the head;
    wherein the stringer has a vertical height extending from the bottom portion of the stringer hole to the upper portion thereof, and the shear tie and the clip define non-contiguous elements spaced vertically apart by at least the height of the stringer; and
    wherein the clip is defined by a flat planar body that extends from only one side of the web.

2. The rib of claim 1, in which the clip is formed integrally with the web.

3. The rib of claim 1, in which the clip and shear tie are formed integrally with the web.

4. The rib of claim 1, in which the web, shear tie, and clip are formed of a composite material.

5. The rib of claim 1, in which the shear tie includes a base end aligned with the web, a connection end extending at an angle relative to the base end, and a transition portion extending from the base end to the connection end.

6. The rib of claim 5, in which the transition portion of the shear tie extends along a shear tie radius, and the transition portion of the clip extends along a clip radius.

7. The rib of claim 6, in which the clip radius is equal to the shear tie radius.

8. The rib of claim 1, in which:
    the web defines a web axis;
    the base of the clip defines a base axis; and
    the base axis is coincident with the web axis.

9. A torque box for a wing structure of an aircraft, the torque box comprising:
    a front spar and a rear spar;
    an upper skin panel extending from the front spar to the rear spar;
    a lower skin panel extending from the front spar to the rear spar;
    a stringer coupled to at least one of the upper and lower skin panels and oriented along a span direction of the wing structure;
    a rib oriented along a chord direction of the wing structure, the rib including:
        a web defining at least one stringer hole having first extremity adjacent one of the skin panels, and having a second extremity vertically spaced from the first extremity, the stringer hole being sized to receive the stringer;
        a shear tie coupled to the web and configured to engage the at least one of the upper and lower skin panels; and
        a clip positioned adjacent the at least one stringer hole, the clip having a base coupled to and aligned with the web, a head extending at an angle relative to the base and configured to engage the stringer, and a transition portion extending between the base and the head;
    wherein the stringer has a vertical height extending from the first extremity of the stringer hole to the second extremity thereof, and the shear tie and the clip define non-contiguous elements spaced vertically apart by at least the height of the stringer; and
    wherein the clip is defined by a flat planar body that extends from only one side of the web.

10. The torque box of claim 9, in which the clip and shear tie are formed integrally with the web.

11. The torque box of claim 9, in which the web, shear tie, and clip are formed of a composite material.

12. The torque box of claim 9, in which the shear tie includes a base end aligned with the web, a connection end extending at an angle relative to the base end, and a transition portion extending from the base end to the connection end.

13. The torque box of claim 12, in which the transition portion of the shear tie extends along a shear tie radius, and the transition portion of the clip extends along a clip radius.

14. The torque box of claim 13, in which the clip radius is equal to the shear tie radius.

15. The torque box of claim 9, in which:
    the web defines a web axis;
    the base of the clip defines a base axis; and
    the base axis is coincident with the web axis.

16. A torque box for a wing structure of an aircraft, the torque box comprising:
    a front spar and a rear spar;
    an upper skin panel extending from the front spar to the rear spar;
    a lower skin panel extending from the front spar to the rear spar;

a stringer coupled to at least one of the upper and lower skin panels and oriented along a span direction of the wing structure;

a rib oriented along a chord direction of the wing structure, the rib including:

a web defining a web axis and at least one stringer hole having first extremity adjacent one of the skin panels, and having a second extremity vertically spaced from the first extremity, the stringer hole being sized to receive the stringer;

a shear tie formed integrally with the web and configured to engage the at least one of the upper and lower skin panels; and a clip formed integrally with the web and positioned adjacent the at least one stringer hole, the clip having a base defining a base axis, a head extending at an angle relative to the base and configured to engage the stringer, and a transition portion extending between the base and the head, wherein the base axis is coincident with the web axis;

wherein the stringer has a vertical height extending from the first extremity of the stringer hole to the second extremity thereof, and the shear tie and the clip define non-contiguous elements spaced vertically apart by at least the height of the stringer; and wherein the clip is defined by a flat planar body that extends from only one side of the web.

17. The torque box of claim 16, in which the web, shear tie, and clip are formed of a composite material.

18. The torque box of claim 16, in which the shear tie includes a base end aligned with the web, a connection end extending at an angle relative to the base end, and a transition portion extending from the base end to the connection end.

19. The torque box of claim 18, in which the transition portion of the shear tie extends along a shear tie radius, and the transition portion of the clip extends along a clip radius.

20. The torque box of claim 19, in which the clip radius is equal to the shear tie radius.

* * * * *